United States Patent
Banju et al.

(10) Patent No.: US 12,485,371 B2
(45) Date of Patent: Dec. 2, 2025

(54) FILTER

(71) Applicant: Murata Manufacturing Co., Ltd., Nagaokakyo (JP)

(72) Inventors: Masaru Banju, Nagaokakyo (JP); Shusuke Yokota, Nagaokakyo (JP); Takashi Kondo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 463 days.

(21) Appl. No.: 17/981,664

(22) Filed: Nov. 7, 2022

(65) Prior Publication Data
US 2023/0053689 A1 Feb. 23, 2023

Related U.S. Application Data

(63) Continuation of application No. PCT/JP2021/014325, filed on Apr. 2, 2021.

(30) Foreign Application Priority Data

May 18, 2020 (JP) ................. 2020-086802

(51) Int. Cl.
*B01D 29/05* (2006.01)
*B01D 29/01* (2006.01)
(Continued)

(52) U.S. Cl.
CPC ........... *B01D 29/05* (2013.01); *B01D 29/014* (2013.01); *B01D 39/10* (2013.01);
(Continued)

(58) Field of Classification Search
CPC ...... B01D 29/05; B01D 29/014; B01D 39/10; B01D 46/0005; B01D 46/16;
(Continued)

(56) References Cited

U.S. PATENT DOCUMENTS 4,404,006 A * 9/1983 Williams ............... B01D 46/10
55/497
2002/0027101 A1 3/2002 Insley et al.
(Continued)

FOREIGN PATENT DOCUMENTS

JP S55162371 A 12/1980
JP 2002518151 A 6/2002
(Continued)

OTHER PUBLICATIONS

International Search Report in PCT/JP2021/014325, mailed on Jun. 8, 2021, 3 pages.

*Primary Examiner* — Madeline Gonzalez
(74) *Attorney, Agent, or Firm* — ArentFox Schiff LLP

(57) ABSTRACT

A filter that includes: a filter base portion having a first main surface and a second main surface, the filter base portion defining a plurality of through-holes connecting the first main surface and the second main surface via an inner wall extending from the second main surface toward the first main surface; and a support portion that has a plurality of protruding portions located in respective through-holes of the plurality of through-holes and disposed on the second main surface of the filter base portion, the plurality of protruding portions having an outer wall in contact with the inner wall of the filter base portion, wherein a first opening on the first main surface side of the filter base portion is larger than a second opening on the second main surface side of the filter base portion, and there is a clearance between the filter base portion and the support portion.

17 Claims, 12 Drawing Sheets

(51) Int. Cl.
*B01D 39/10* (2006.01)
*B01D 46/00* (2022.01)
*B01D 46/16* (2006.01)

(52) U.S. Cl.
CPC ......... *B01D 46/0005* (2013.01); *B01D 46/16* (2013.01); *B01D 2201/0415* (2013.01); *B01D 2265/06* (2013.01)

(58) Field of Classification Search
CPC ........ B01D 2201/0415; B01D 2265/06; B01D 2239/0654; B01D 2239/10; B01D 2239/1216
USPC .... 210/498, 499, 495, 471, 494.3, 446, 439, 210/448, 451, 454, 459, 463, 479
See application file for complete search history.

(56) References Cited

U.S. PATENT DOCUMENTS

| | | |
|---|---|---|
| 2017/0216744 A1 | 8/2017 | Kondo et al. |
| 2018/0021709 A1 | 1/2018 | Yamamoto et al. |
| 2019/0225930 A1 | 7/2019 | Chen et al. |

FOREIGN PATENT DOCUMENTS

| | | |
|---|---|---|
| JP | 2007275875 A | 10/2007 |
| JP | 2019181352 A | 10/2019 |
| WO | 2016208362 A1 | 12/2016 |
| WO | 2017141609 A1 | 8/2017 |
| WO | 2018191611 A1 | 10/2018 |

\* cited by examiner

FILTER

CROSS REFERENCE TO RELATED APPLICATIONS

The present application is a continuation of International application No. PCT/JP2021/014325, filed Apr. 2, 2021, which claims priority to Japanese Patent Application No. 2020-086802, filed May 18, 2020, the entire contents of each of which are incorporated herein by reference.

FIELD OF THE INVENTION

The present invention relates to a filter.

BACKGROUND OF THE INVENTION

Patent Document 1 discloses a mesh member including a mesh having recesses for capturing particles and holes formed in the recesses, and an outer frame for fixing the outer periphery of the mesh. In the mesh member of Patent Document 1, a belt-like support frame embedded over a recess and a hole continuous with the recess is provided across opposing frame sides of the outer frame.

Patent Document 1: Japanese Unexamined Patent Application Publication No. 2019-181352

SUMMARY OF THE INVENTION

However, there is still room for improvement in the mesh member of Patent Document 1 in terms of improvement in strength.

An object of the present invention is to provide a filter with improved strength.

A filter of an aspect of the present invention includes: a filter base portion having a first main surface and a second main surface opposite to the first main surface, the filter base portion defining a plurality of through-holes connecting the first main surface and the second main surface via an inner wall extending from the second main surface toward the first main surface; and a support portion that has a plurality of protruding portions located in respective through-holes of the plurality of through-holes and disposed on the second main surface of the filter base portion, the plurality of protruding portions having an outer wall in contact with the inner wall of the filter base portion, wherein, in the respective through-holes in which the plurality of protruding portions are located, a first opening on the first main surface side of the filter base portion is larger than a second opening on the second main surface side of the filter base portion, and there is a clearance between the filter base portion and the support portion.

According to the present invention, it is possible to provide a filter capable of improving the strength.

Figure 1:
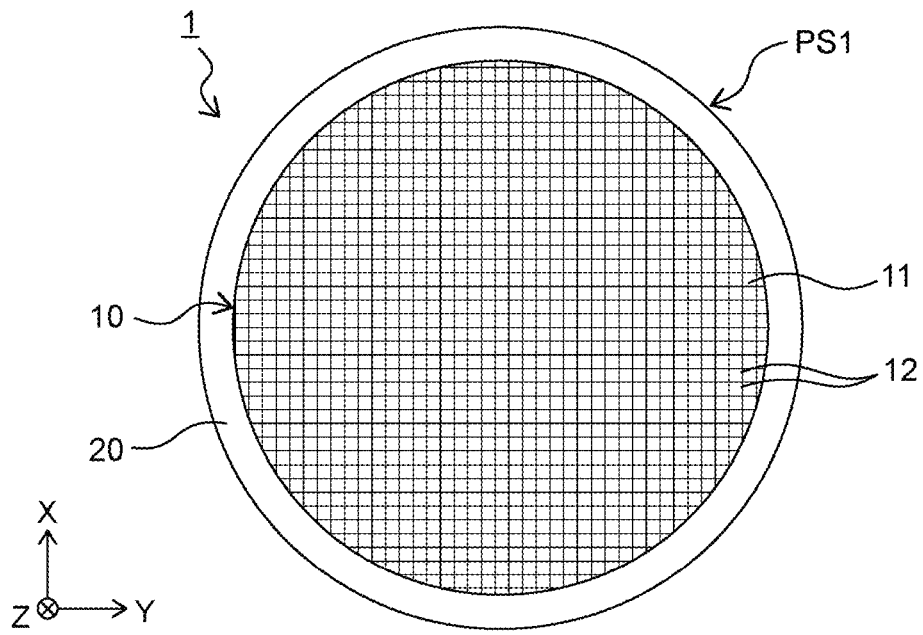
FIG. 1 is a schematic view of an example of a filter according to Embodiment 1 of the present invention as viewed from a first main surface side.

DETAILED DESCRIPTION OF THE PREFERRED EMBODIMENTS (Background to the Present Invention)

As in the mesh member described in Patent Document 1, a filter is known in which strength is improved by providing a support portion in a filter portion in which a plurality of through-holes is formed.

However, such a filter still has room for improvement in terms of improving the strength thereof. For example, it is difficult to improve the strength against bending at a portion where the support portion is provided in the filter.

For example, when a liquid containing a filtration object is filtered, stress applied to the filter is released by bending the filter in the thickness direction. In other words, when an external force is applied to the filter, the filter is deformed to relax the stress applied to the filter. However, a portion of the filter where the support portion is provided is not easily deformed when the external force is applied thereto. For this reason, it is difficult to relax the stress applied to the filter in the portion where the support portion is provided.

In order to solve the above problems, the present inventors have found a filter in which a clearance is provided between a filter base portion in which a plurality of through-holes is formed and the support portion, and have completed the present invention. Accordingly, when force is applied from the outside, the filter is deformed in the clearance, and the stress applied to the filter can be relaxed.

A filter of an aspect of the present invention includes: a filter base portion having a first main surface and a second main surface opposite to the first main surface, the filter base portion defining a plurality of through-holes connecting the first main surface and the second main surface via an inner wall extending from the second main surface toward the first main surface; and a support portion that has a plurality of protruding portions located in respective through-holes of the plurality of through-holes and disposed on the second main surface of the filter base portion, the plurality of protruding portions having an outer wall in contact with the inner wall of the filter base portion, wherein, in the respective through-holes in which the plurality of protruding portions are located, a first opening on the first main surface side of the filter base portion is larger than a second opening on the second main surface side of the filter base portion, and there is a clearance between the filter base portion and the support portion.

With such a configuration, the strength of the filter can be improved.

The clearance may be formed between the inner wall of the filter base portion and outer wall of the plurality of protruding portions.

With such a configuration, the strength of the filter can be further improved.

The clearance may be located at least on the first main surface of the filter base portion.

With such a configuration, the strength of the filter can be further improved.

The inner wall is formed by a flat surface extending obliquely from the second main surface toward the first main surface of the filter base portion, and the outer wall may be formed by a flat surface extending obliquely from the second main surface toward the first main surface of the filter base portion.

With such a configuration, the strength of the filter can be further improved.

Each of the plurality of protruding portions may have a protruding surface located on the first main surface, and when the filter base portion is viewed from the first main surface, an external dimension of the protruding surface may be 0.5 times to less than 1.0 times a dimension of the first opening.

With such a configuration, the strength of the filter can be further improved.

The support portion may include a plurality of first support members extending in a first direction and a plurality of second support members extending in a second direction intersecting the first direction.

With such a configuration, the strength of the filter can be further improved.

A thermal expansion coefficient of the filter base portion and a thermal expansion coefficient of the support portion may be substantially equal to each other.

With such a configuration, damage to the filter due to temperature change can be suppressed, and the strength of the filter can be further improved.

The filter base portion and the support portion may contain at least one of a metal and a metal oxide as a main component.

With such a configuration, the strength of the filter can be further improved.

Hereinafter, Embodiment 1 according to the present invention will be described with reference to the accompanying drawings. In addition, in each of the drawings, each element is illustrated in an exaggerated manner for ease of explanation.

Embodiment 1

[Overall Configuration]

Figure 2:
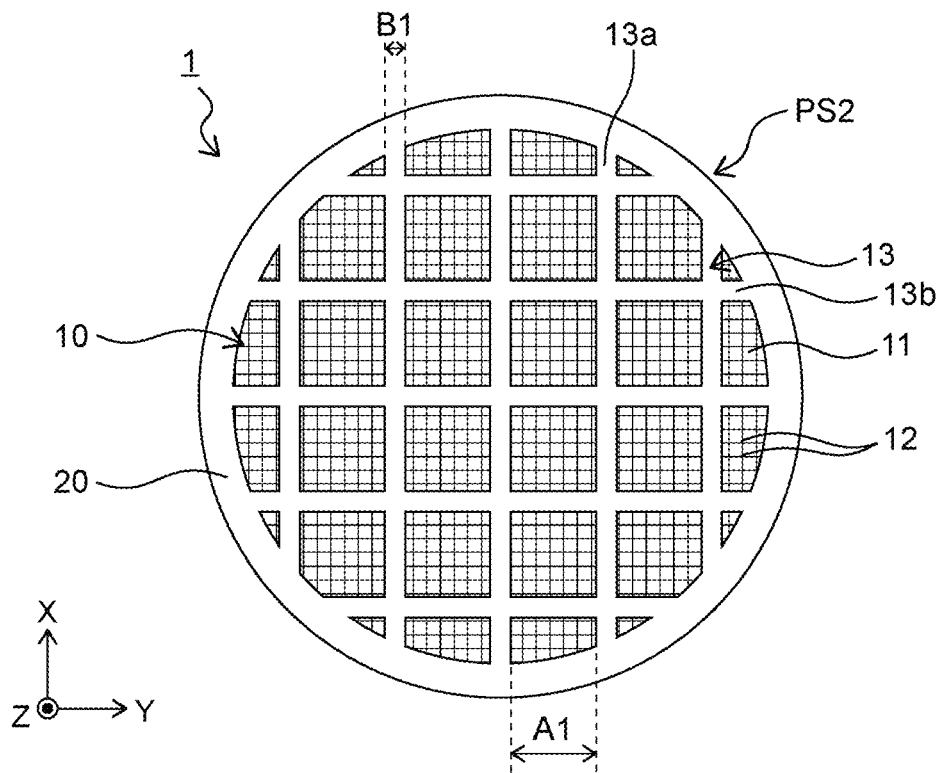
FIG. 2 is a schematic view of an example of the filter according to Embodiment 1 of the present invention as viewed from a second main surface side.

FIG. 1 is a schematic view of an example of a filter 1 according to Embodiment 1 of the present invention as viewed from a first main surface PS1 side. FIG. 2 is a schematic view of an example of the filter 1 according to Embodiment 1 of the present invention as viewed from a second main surface PS2 side. In the drawings, X, Y, and Z directions indicate a longitudinal direction, a lateral direction, and a thickness direction of the filter 1, respectively.

For example, the filter 1 is a filter that filters a fluid containing a filtration object.

In this specification, the "filtration object" means an object to be filtered of objects contained in a fluid. For example, the filtration object may be a biological substance contained in a fluid. The "biological substance" means a substance derived from an organism such as a cell (eukaryote), a bacterium (eubacterium), or a virus. Examples of cells (eukaryotes) include induced pluripotent stem cells (iPS cells), ES cells, stem cells, mesenchymal stem cells, mononuclear cells, single cells, cell aggregates, floating cells, adherent cells, nerve cells, leukocytes, cells for regenerative medicine, autologous cells, cancer cells, circulating tumor cells (CTCs) in the blood, HL-60, HELA, and fungi. Examples of bacteria (eubacteria) include Escherichia coli and Mycobacterium tuberculosis.

Examples of the fluid include a liquid and a gas. Examples of the liquid include a cell suspension.

The filter 1 is a metal filter. A material constituting the filter 1 contains at least one of a metal and a metal oxide as a main component. The material constituting the filter 1 may be, for example, gold, silver, copper, platinum, nickel, palladium, titanium, an alloy thereof, or an oxide thereof. In particular, by using titanium or a nickel-palladium alloy, the elution of metal is small, and the influence on the filtration object can be reduced.

As illustrated in FIG. 1 and FIG. 2, the filter 1 includes a filter portion 10 and a frame portion 20 provided on an outer periphery of the filter portion 10. In addition, the filter 1 has the first main surface PS1 and the second main surface PS2 on the side opposite to the first main surface PS1. In Embodiment 1, the filter portion 10 and the frame portion 20 are integrally formed.

<Filter Portion>

The filter portion 10 is a portion that filters a fluid containing the filtration object. The filter portion 10 is composed of a filter base portion 12 in which a plurality of through-holes 11 connecting the first main surface PS1 and the second main surface PS2 are formed. In addition, in the filter portion 10, a plurality of support portions 13 are disposed on the second main surface PS2 of the filter base portion 12.

The shape of the filter portion 10 is, for example, a circle, a polygon, or an ellipse when viewed from the thickness direction (Z direction) of the filter 1. In Embodiment 1, the shape of the filter portion 10 is substantially circular. Note that in this specification, the term "substantially circular" means that the ratio of the length of the major diameter to the length of the minor diameter is 1.0 to 1.2.

<Frame Portion>

The frame portion 20 is a portion provided in the outer periphery of the filter portion 10, and having a smaller number of through-holes 11 per unit area than the filter portion 10. The number of through-holes 11 in the frame portion 20 is equal to or less than 1% of the number of through-holes 11 in the filter portion 10. The thickness of the frame portion 20 may be thicker than the thickness of the filter portion 10. With such a configuration, mechanical strength of the filter 1 can be increased.

When the filter 1 is used by being connected to an apparatus, the frame portion 20 may function as a connection portion that connects the filter 1 and the apparatus. Further, information of the filter 1 (dimension of the through-hole 11 and the like) may be displayed on the frame portion 20.

The frame portion 20 is formed in a ring shape when viewed from the first main surface PS1 side of the filter portion 10. When the filter 1 is viewed from the first main surface PS1 side, the center of the frame portion 20 coincides with the center of the filter portion 10. That is, the frame portion 20 is formed concentrically with the filter 1.

Hereinafter, the filter portion 10 will be described in detail.

Figure 3:
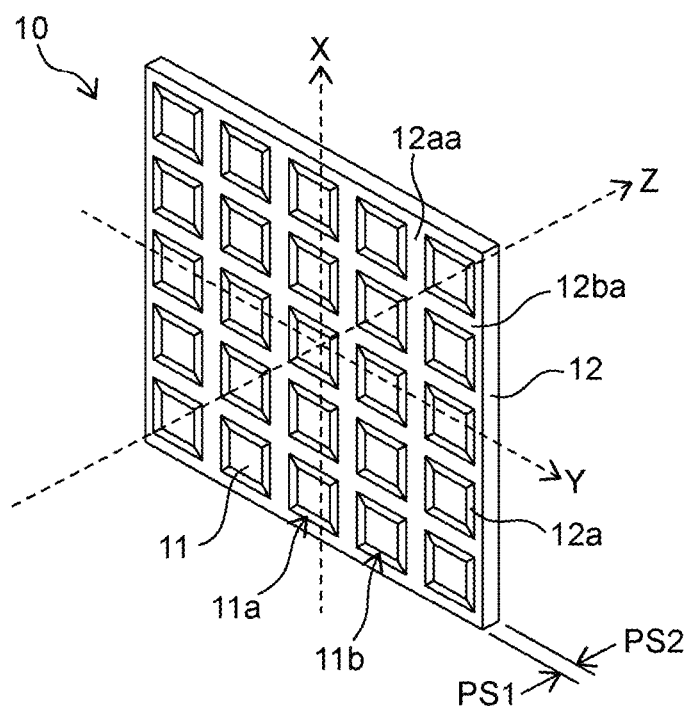
FIG. 3 is an enlarged perspective view of a part of a filter portion.
Figure 4:
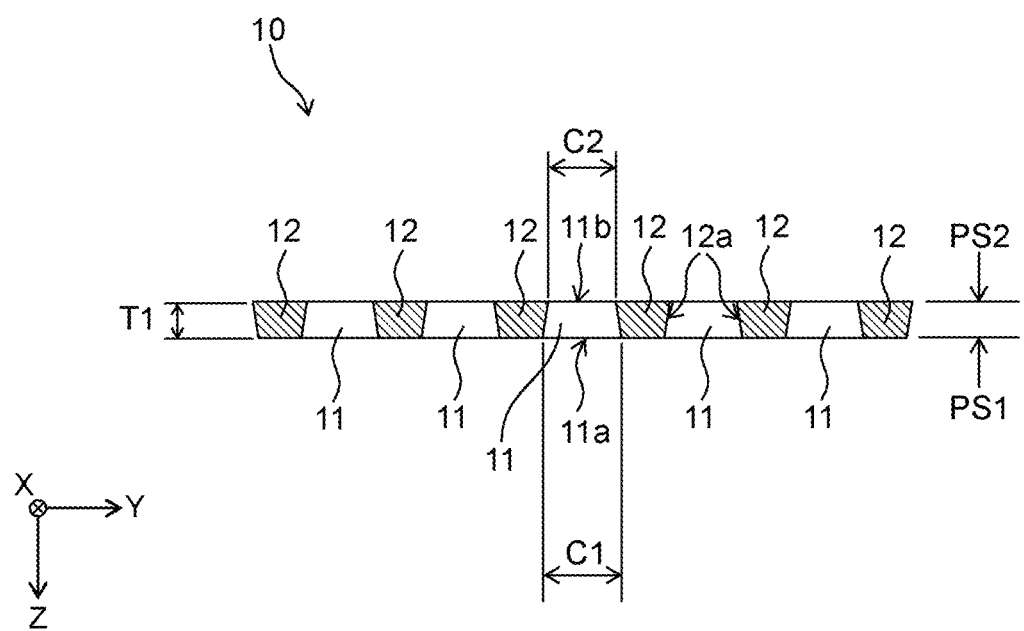
FIG. 4 is an enlarged cross-sectional view of the filter portion of FIG. 3 cut in a Y direction.

FIG. 3 is an enlarged perspective view of a part of the filter portion 10. FIG. 3 illustrates a part of the filter base portion 12 in which the plurality of through-holes 11 are formed in an enlarged manner. FIG. 4 is an enlarged cross-sectional view of the filter portion 10 of FIG. 3 cut in the Y direction.

As illustrated in FIG. 3 and FIG. 4, the plurality of through-holes 11 are periodically arranged on the first main surface PS1 and the second main surface PS2 of the filter portion 10. Specifically, the plurality of through-holes 11 are provided at equal intervals in a matrix in the filter portion 10.

In Embodiment 1, the plurality of through-holes 11 are provided along two arrangement directions parallel to each of the sides of the square when viewed from the first main surface PS1 side (Z direction) of the filter portion 10, that is, along the X direction and the Y direction in FIG. 3. Note that the plurality of through-holes 11 may be provided in the filter portion 10, and the arrangement direction is not limited.

In the filter portion 10, a portion where the through-holes 11 are not formed is formed by the filter base portion 12. As illustrated in FIG. 3, the filter base portion 12 is formed in a lattice shape. To be specific, the filter base portion 12 includes a plurality of first base members 12aa arranged at equal intervals and extending in a first direction and a plurality of second base members 12ba arranged at equal intervals and extending in a direction intersecting the first direction in the filter portion 10.

The plurality of first base members 12aa and the plurality of second base members 12ba are formed of plate-shaped members. The plurality of through-holes 11 are defined by the intersection of the plurality of first base members 12aa and the plurality of second base members 12ba. In Embodiment 1, the first direction in which the plurality of first base members 12aa extends is the X direction, and the second direction in which the plurality of second base members 12ba extends is the Y direction. That is, in Embodiment 1, the first direction and the second direction are orthogonal to each other.

In Embodiment 1, the plurality of first base members 12aa and the plurality of second base members 12ba are integrally formed.

The filter base portion 12 has an inner wall 12a extending from the second main surface PS2 toward the first main surface PS1 and defining the plurality of through-holes 11. In Embodiment 1, the inner wall 12a is formed by a flat surface that extends obliquely from the second main surface PS2 toward the first main surface PS1 of the filter base portion 12. Thus, as illustrated in FIG. 4, the filter base portion 12 has a trapezoidal cross-sectional shape. That is, the filter base portion 12 has a tapered shape. As such, the through-hole 11 has a trapezoidal shape in a cross section obtained by cutting the filter portion 10 in the Y direction.

A thickness T1 of the filter base portion 12 in the filter portion 10 is 0.5 μm to 20 μm. It is possible to reduce pressure loss of a fluid passing through the filter while providing mechanical strength. Preferably, the thickness T1 of the filter base portion 12 in the filter portion 10 is 1.0 μm to 3 μm. The pressure loss of the fluid passing through the filter can be further reduced.

A first opening 11a of the through-hole 11 is formed on the first main surface PS1 side of the filter portion 10. In addition, a second opening 11b of the through-hole 11 is formed on the second main surface PS2 side of the filter portion 10. In Embodiment 1, the first opening 11a and the second opening 11b each have a square shape when viewed from the first main surface PS1 side.

When the filter base portion 12 is viewed from the first main surface PS1, the first opening 11a is larger than the second opening 11b. In other words, a dimension C1 of the first opening 11a is larger than a dimension C2 of the second opening 11b. The dimension C1 of the first opening 11a and the dimension C2 of the second opening 11b are dimensions that determine the shape of the opening. In Embodiment 1, each of the dimensions C1 and C2 may be one side of the square shape. Alternatively, for example, when the shapes of the first opening 11a and the second opening 11b are circular shapes, the dimensions C1 and C2 may be diameters.

For example, the dimension C1 of the first opening 11a is 0.5 μm to 400 μm. Preferably, the dimension C1 of the first opening 11a is 1 μm to 30 μm.

For example, the dimension C2 of the second opening 11b is 0.5 μm to 380 μm. Preferably, the dimension C2 of the second opening 11b is 0.8 μm to 29 μm.

When the filter base portion 12 is viewed from the first main surface PS1, an opening area of the first opening 11a is larger than an opening area of the second opening 11b. The opening area of the first opening 11a is an area defined by the first opening 11a when viewed from the first main surface PS1 side of the filter portion 10. The opening area of the second opening 11b is an area defined by the second opening 11b when viewed from the second main surface PS2 side of the filter portion 10.

Note that the shape of the first opening 11a and the second opening 11b is not limited to a square shape. For example, the shape of the first opening 11a and the second opening 11b may be a circular shape, an elliptical shape, a rectangular shape, a polygonal shape, or the like.

In the filter portion 10, the first main surface PS1 and the second main surface PS2 preferably have small surface roughness. Here, the surface roughness means an average value of differences between a maximum value and a minimum value measured by a stylus profilometer at arbitrary five points. In Embodiment 1, the surface roughness is preferably smaller than the size of the filtration object, and more preferably smaller than half the size of the filtration object. This is because adhesion of the filtration object is reduced, and the filtration object can be collected with high efficiency after being captured by the filter.

Returning to FIG. 2, the support portion 13 is disposed on the second main surface PS2 of the filter portion 10. In other words, the support portion 13 is disposed on the second main surface PS2 of the filter base portion 12.

The support portion 13 is formed in a lattice shape. To be specific, the support portion 13 includes a plurality of first support members 13a extending in a first direction and a plurality of second support members 13b extending in a second direction intersecting the first direction. In Embodiment 1, the first direction is the X direction, and the second direction is the Y direction. That is, the plurality of first support members 13a and the plurality of second support members 13b are orthogonal to each other.

The plurality of first support members 13a and the plurality of second support members 13b are formed of plate-shaped members. The plurality of first support members 13a and the plurality of second support members 13b are integrally formed.

The plurality of first support members 13a and the plurality of second support members 13b are arranged at equal intervals. For example, an interval A1, respectively, between the plurality of first support members 13a and the plurality of second support members 13b is 200 μm to 500 μm. Preferably, the interval A1 is 250 μm to 350 μm. The number of through-holes 11 blocked by the support portion 13 is reduced, and mechanical strength is obtained.

When the filter portion 10 is viewed from the second main surface PS2 side, a width B1 of the plurality of first support members 13a and the plurality of second support members 13b is larger than the width of the plurality of first plate-shaped members and the plurality of second plate-shaped members of the filter base portion 12. For example, the width B1 of the plurality of first support members 13a and the plurality of second support members 13b is 5 μm to 40 μm. Preferably, the width B1 is 10 μm to 25 μm. The number of through-holes 11 blocked by the support portion 13 is reduced, and mechanical strength is obtained.

Figure 5:
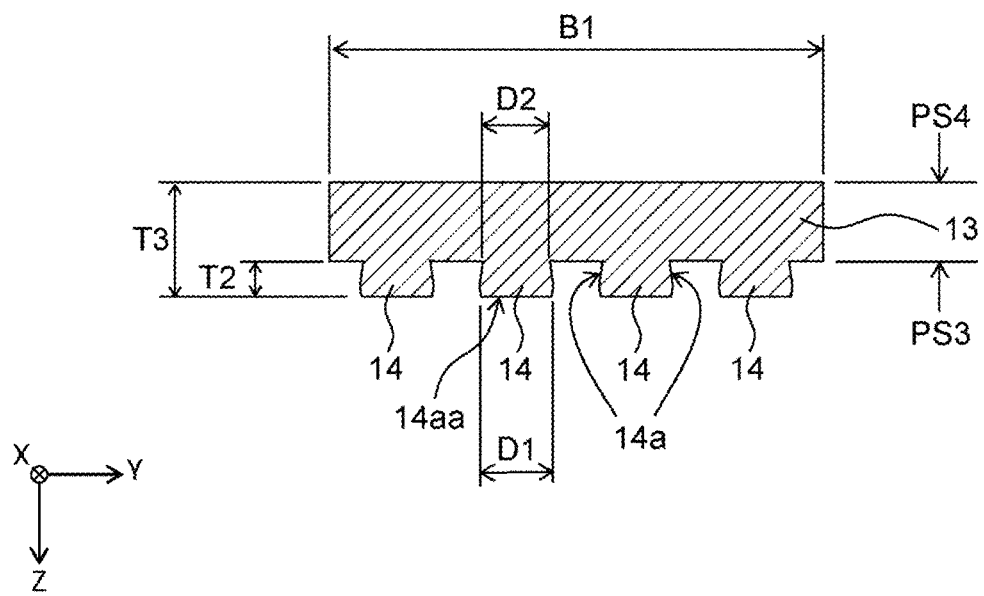
FIG. 5 is an enlarged cross-sectional view of an example of a support portion.

FIG. 5 is an enlarged cross-sectional view of an example of the support portion 13. As illustrated in FIG. 5, the support portion 13 has a plurality of protruding portions 14.

To be specific, the support portion 13 is a plate-shaped member having a third main surface PS3 and a fourth main surface PS4 on the side opposite to the third main surface PS3. The third main surface PS3 of the support portion 13 is in contact with the second main surface PS2 of the filter base portion 12.

The plurality of protruding portions 14 protrudes on the third main surface PS3 of the support portion 13 in a direction from the fourth main surface PS4 toward the third main surface PS3. Each of the plurality of protruding portions 14 are formed in a convex shape having a protruding surface 14aa and an outer wall 14a connecting the protruding surface 14aa and the third main surface PS3 of the support portion 13. In Embodiment 1, each of the plurality of protruding portions 14 has a truncated quadrangular pyramid shape.

The protruding surface 14aa is a surface protruding from the third main surface PS3 of the support portion 13, and is formed to be flattened.

A height T2 of the protruding portion 14 is equal to the depth of the through-hole 11. The height T2 of the protruding portion 14 is a distance from the third main surface PS3 of the support portion 13 to the protruding surface 14aa. For example, the height T2 of the protruding portion 14 is 0.5 μm to 20 μm. Preferably, the height T2 of the protruding portion 14 is 1.0 μm to 3 μm.

Note that a thickness T3 of the support portion 13 is, for example, 5 μm to 40 μm. Preferably, the thickness T3 of the support portion 13 is 10 μm to 25 μm.

The outer wall 14a is in contact with the inner wall 12a of the filter base portion 12. The outer wall 14a extends obliquely toward a protruding direction of the protruding portion 14. The protruding direction of the protruding portion 14 is a direction from the fourth main surface PS4 of the support portion 13 toward the third main surface PS3. The outer wall 14a is inclined so that the outer shape of the protruding portion 14 becomes larger toward the protruding direction. In Embodiment 1, the outer wall 14a is formed by a flat surface. That is, the protruding portion 14 has an inverse tapered shape.

The outer shape of the protruding portion 14 becomes larger toward the protruding direction of the protruding portion 14. To be specific, an external dimension D1 of the protruding surface 14aa of the protruding portion 14 is larger than an external dimension D2 of the protruding portion 14 located on the third main surface PS3. The external dimensions D1 and D2 are dimensions that determine the shape of the protruding portion 14. In Embodiment 1, the external dimensions D1 and D2 may be one side of a square shape. Alternatively, when the protruding portion 14 has a truncated conical shape, the external dimensions D1 and D2 may be diameters.

When the filter base portion 12 is viewed from the first main surface PS1, the external dimension D1 of the protruding surface 14aa of the protruding portion 14 is smaller than the dimension C1 of the first opening 11a. For example, the external dimension D1 is equal to or more than 0.5 times and less than 1.0 times the dimension C1 of the first opening 11a.

When the filter base portion 12 is viewed from the first main surface PS1, the area of the protruding surface 14aa of the protruding portion 14 is smaller than the opening area of the first opening 11a.

When the filter base portion 12 is viewed from the first main surface PS1, the external dimension D2 of the protruding portion 14 located on the third main surface PS3 of the support portion 13 is substantially equal to the dimension C2 of the second opening 11b. The external dimension D2 being substantially equal to the dimension C2 of the second opening 11b means that the external dimension D2 is 0.9 times to 1.0 times the dimension C2.

When the filter base portion 12 is viewed from the first main surface PS1, the cross-sectional area of the protruding portion 14 located on the third main surface PS3 of the support portion 13 obtained by cutting in the Y direction is substantially equal to the opening area of the second opening 11b.

The plurality of protruding portions 14 are provided corresponding to the positions of the plurality of through-holes 11. To be specific, the plurality of protruding portions 14 are periodically arranged on the third main surface PS3 of the support portion 13. For example, the plurality of protruding portions 14 are provided at equal intervals in a matrix on the third main surface PS3 of the support portion 13. That is, the plurality of protruding portions 14 are provided along the X direction and the Y direction.

Figure 6:
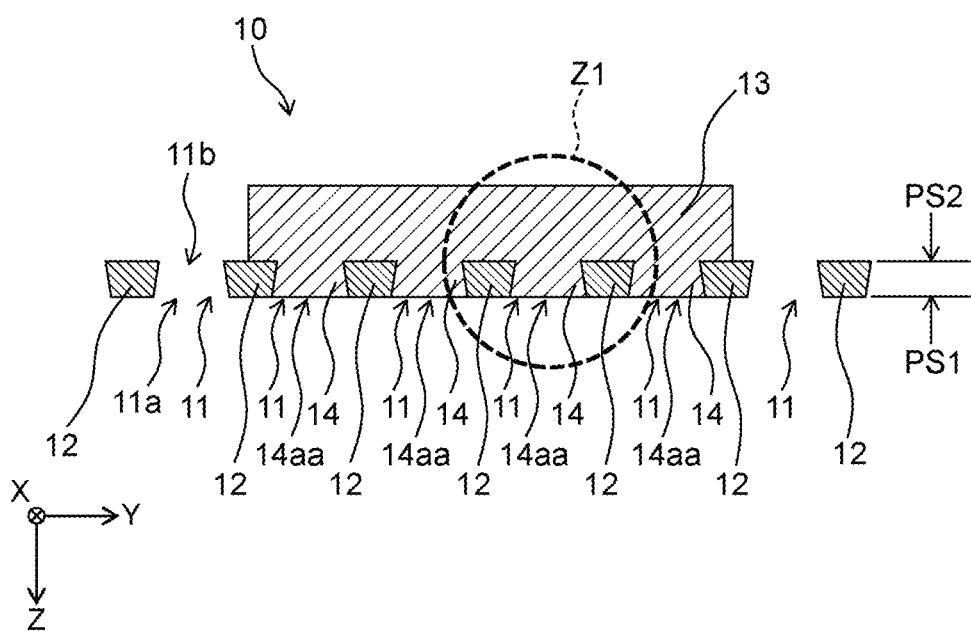
FIG. 6 is an enlarged cross-sectional view of a portion where the support portion is disposed in the filter portion.
Figure 7:
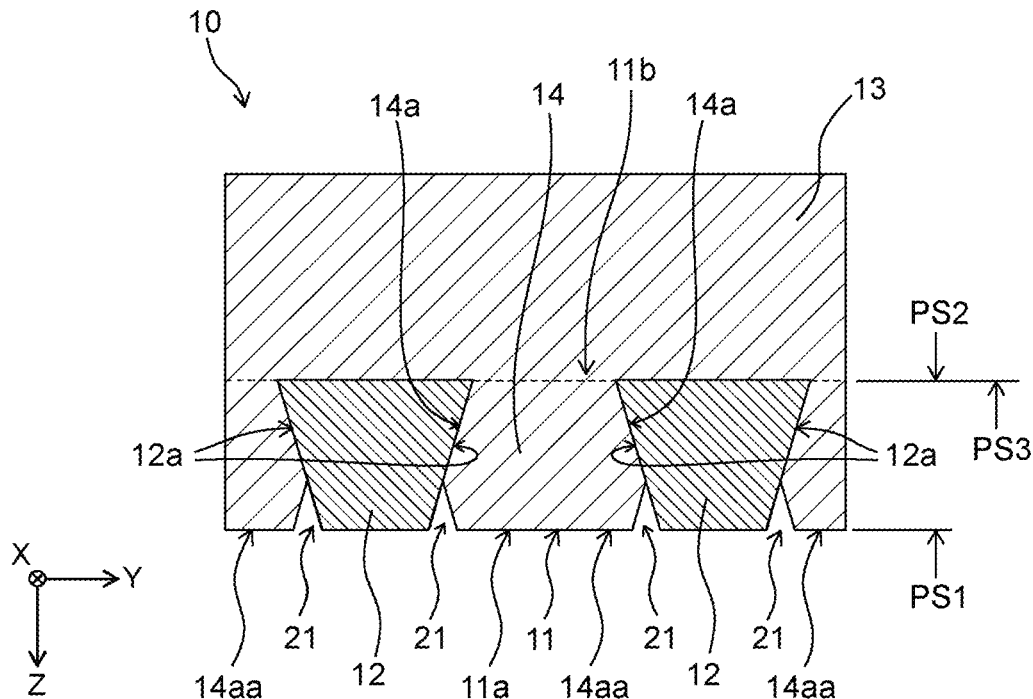
FIG. 7 is an enlarged view of a Z1 portion of the filter portion of FIG. 6 in an enlarged manner.

FIG. 6 is an enlarged cross-sectional view of a portion where the support portion 13 is disposed in the filter portion 10. FIG. 7 is an enlarged view of a Z1 portion of the filter portion 10 of FIG. 6 in an enlarged manner. As illustrated in FIG. 6 and FIG. 7, the support portion 13 is disposed on the second main surface PS2 of the filter base portion 12. The plurality of protruding portions 14 of the support portion 13 is located in the plurality of through-holes 11. The protruding surface 14aa of the protruding portion 14 is located at the same height as the first main surface PS1 of the filter base portion 12.

The inner wall 12a of the filter base portion 12 and the outer wall 14a of the plurality of protruding portions 14 are in contact with each other. That is, the plurality of protruding portions 14 are in contact with the inner wall 12a of the filter base portion 12 in the through-hole 11. In addition, the third main surface P3 of the support portion 13 and the second main surface PS2 of the filter base portion 12 are in contact with each other. Accordingly, it is possible to prevent the protruding portion 14 from being detached from the filter base portion 12. As a result, the support portion 13 is held on the second main surface PS2 side of the filter base portion 12.

As illustrated in FIG. 7, a clearance 21 is formed between the filter base portion 12 and the support portion 13. In Embodiment 1, the clearance 21 is formed between the inner wall 12a of the filter base portion 12 and the outer wall 14a of the plurality of protruding portions 14. The clearance 21 is located at least on the first main surface PS1 of the filter base portion 12. To be specific, the clearance 21 is open to the first main surface PS1 side of the filter base portion 12. In other words, the clearance 21 communicates with a space outside the first main surface PS1 of the filter base portion 12. For example, the size (length in the Y direction) of the clearance 21 as viewed from the first main surface PS1 side is 0.05 µm to 3.0 µm.

In Embodiment 1, when the filter base portion 12 is viewed from the first main surface PS1 side, the external dimension D1 of the protruding surface 14aa is formed to be smaller than the dimension C1 of the first opening 11a of the through-hole 11. As a result, the clearance 21 is formed between the outer wall 14a of the protruding portion 14 and the inner wall 12a of the filter base portion 12.

By forming the clearance 21 between the filter base portion 12 and the support portion 13, for example, when the filter 1 is bent, the filter 1 can be deformed in the clearance 21. In this way, a space in which the filter 1 is deformed can be secured by the clearance 21.

It is preferable that the thermal expansion coefficient of the material forming the filter base portion 12 and the thermal expansion coefficient of the material forming the support portion 13 be substantially equal to each other. Here, "substantially equal" includes errors within 15%.

For example, the filter base portion 12 and the support portion 13 may be formed of a material of Ni or PdNi (Pd ratio: 50% to 95%). For example, the filter base portion 12 may be formed of Ni, and the support portion 13 may be formed of PdNi. Note that the combination of materials of the filter base portion 12 and the support portion 13 is not limited thereto.

[Manufacturing Method of Filter]

An example of a method for manufacturing the filter 1 will be described with reference to FIGS. 8A to 8H. FIGS. 8A to 8H are schematic views illustrating an example of a manufacturing process of the filter 1 of Embodiment 1 according to the present invention.

Figure 8A:
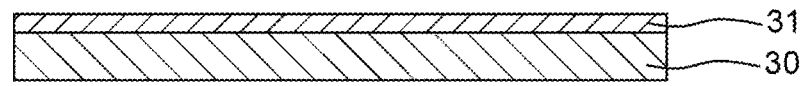
FIG. 8A is a schematic view illustrating an example of a manufacturing process of the filter according to Embodiment 1 of the present invention.

As illustrated in FIG. 8A, a Cu film 31 is formed on a substrate 30. For example, the Cu film 31 is formed by sputtering using a sputtering film forming apparatus. Alternatively, the Cu film 31 may be formed by vapor deposition using a vapor deposition apparatus. At this time, in order to improve adhesion between the substrate 30 and the Cu film 31, a Ti film may be formed between the substrate 30 and the Cu film 31. For example, the thickness of the Cu film 31 is 500 nm, and the thickness of the Ti film is 50 nm.

Figure 8B:
FIG. 8B is a schematic view illustrating an example of the manufacturing process of the filter according to Embodiment 1 of the present invention.

As illustrated in FIG. 8B, a resist is applied onto the Cu film 31 and dried to form a resist film 32. For example, a photosensitive positive liquid resist (Pfi-3A manufactured by Sumitomo Chemical Co., Ltd.) is applied onto the Cu film 31 by using a spin coater. Note that the conditions of the spin coater are, for example, 1140 rpm and 20 sec. Next, the resist is heated and dried using a hot plate to form the resist film 32 having a thickness of 1.95 µm. Note that the baking conditions (heating temperature-heating time) of the hot plate are, for example, 90° C.-60 sec, 60° C.-60 sec, and 23° C.-60 sec.

Figure 8C:
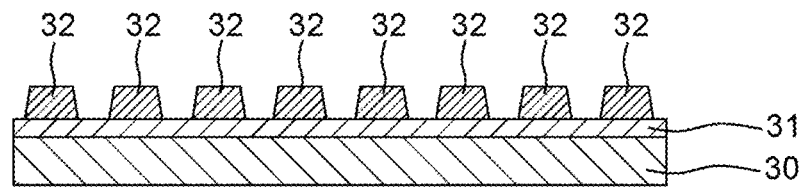
FIG. 8C is a schematic view illustrating an example of the manufacturing process of the filter according to Embodiment 1 of the present invention.

As illustrated in FIG. 8C, the resist film 32 is subjected to exposure and development processing to remove the resist film 32 at a position corresponding to the filter base portion 12. For example, an i-line stepper (Pfi-37A manufactured by Canon) is used as an exposure machine. In the exposure conditions, by setting the focus on the plus side relative to an appropriate value, the cross-sectional shape of the resist film 32 becomes a trapezoidal shape. For example, the exposure conditions are as follows: dose: 2800 mJ/cm$^2$, focus: −0.2 µm.

Development is carried out using a paddle development apparatus. Tetramethylammonium hydroxide (TMAH) is used as a developing solution. The development conditions are, for example, TMAH 2.38% and puddle development: 43 seconds×2 times.

After exposure and development processing, washing with water and drying are carried out.

Figure 8D:
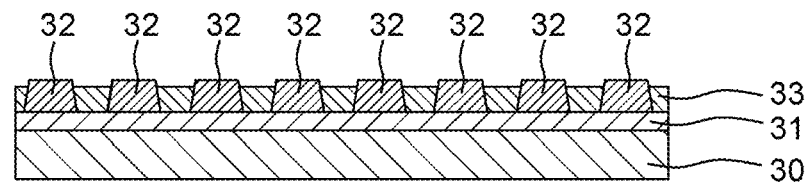
FIG. 8D is a schematic view illustrating an example of the manufacturing process of the filter according to Embodiment 1 of the present invention.

As illustrated in FIG. 8D, electrolytic plating is performed using an electrolytic plating apparatus. As such, a plating film 33 is formed in the portion from which the resist film 32 has been removed. Conditions for the electrolytic plating are, for example, a current density of 2.0 A/dm$^2$, a quantity of electricity of 4.0 AM, a pH of the plating solution of 7.5, and a plating depth of 1.6 µm.

Figure 8E:
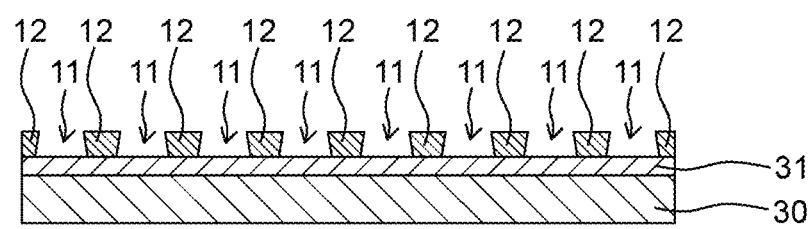
FIG. 8E is a schematic view illustrating an example of the manufacturing process of the filter according to Embodiment 1 of the present invention.

As illustrated in FIG. 8E, the resist film 32 is peeled with a peeling liquid NMP (N-methyl-2-pyrrolidone) by using a resist peeling apparatus capable of high-pressure spray processing. Thereafter, the plating film 33 is cleaned with IPA (isopropyl alcohol) and washed with water, and then dried. As a result, the filter base portion 12 in which the plurality of through-holes 11 are formed is formed.

Figure 8F:
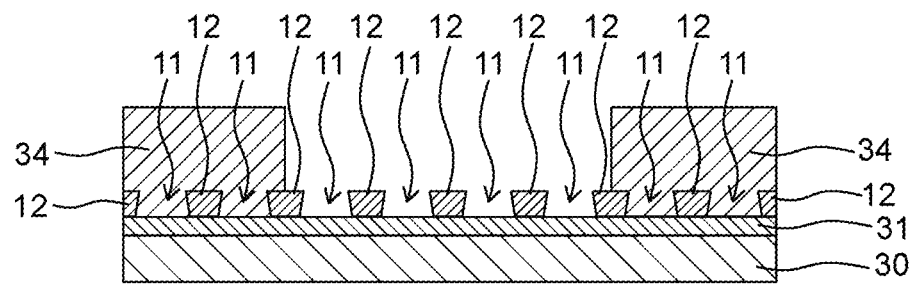
FIG. 8F is a schematic view illustrating an example of the manufacturing process of the filter according to Embodiment 1 of the present invention.

As illustrated in FIG. 8F, a resist film 34 is formed on the filter base portion 12 except for a portion corresponding to the support portion 13. For example, a resist is applied onto the filter base portion 12 and dried to form the resist film 34. The resist film 34 is subjected to exposure and development processing to remove the resist film 34 at a position corresponding to the support portion 13.

Figure 8G:
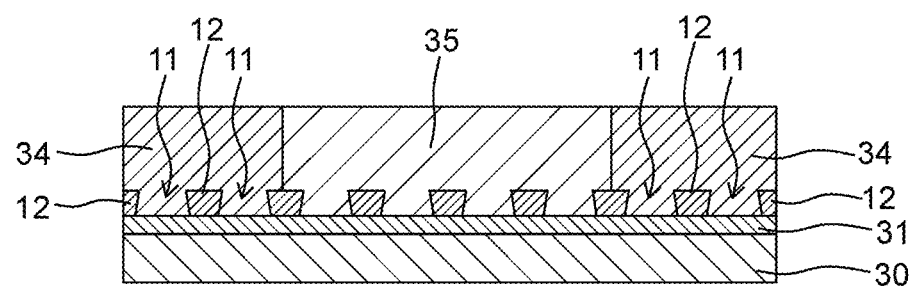
FIG. 8G is a schematic view illustrating an example of the manufacturing process of the filter according to Embodiment 1 of the present invention.

As illustrated in FIG. 8G, electrolytic plating is performed using an electrolytic plating apparatus. As such, a plating film 35 is formed at a portion corresponding to the support portion 13, that is, a portion where the resist film 34 is not formed. Conditions for the electrolytic plating are, for example, a current density of 1.0 A/dm$^2$, a quantity of electricity of 20 AM, a pH of the plating solution of 7.5, and a plating depth of 18 μm. The clearance 21 can be formed between the filter base portion 12 and the support portion 13 by the conditions for the electrolytic plating.

Figure 8H:
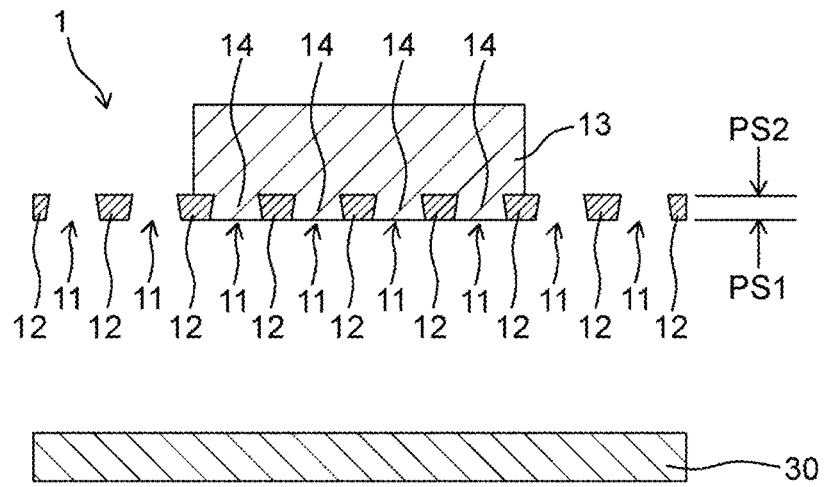
FIG. 8H is a schematic view illustrating an example of the manufacturing process of the filter according to Embodiment 1 of the present invention.

As illustrated in FIG. 8H, the resist film 34 is peeled off, and the Cu film 31 is removed by etching.

In this manner, the filter 1 can be produced.

[Operation]

Figure 9:
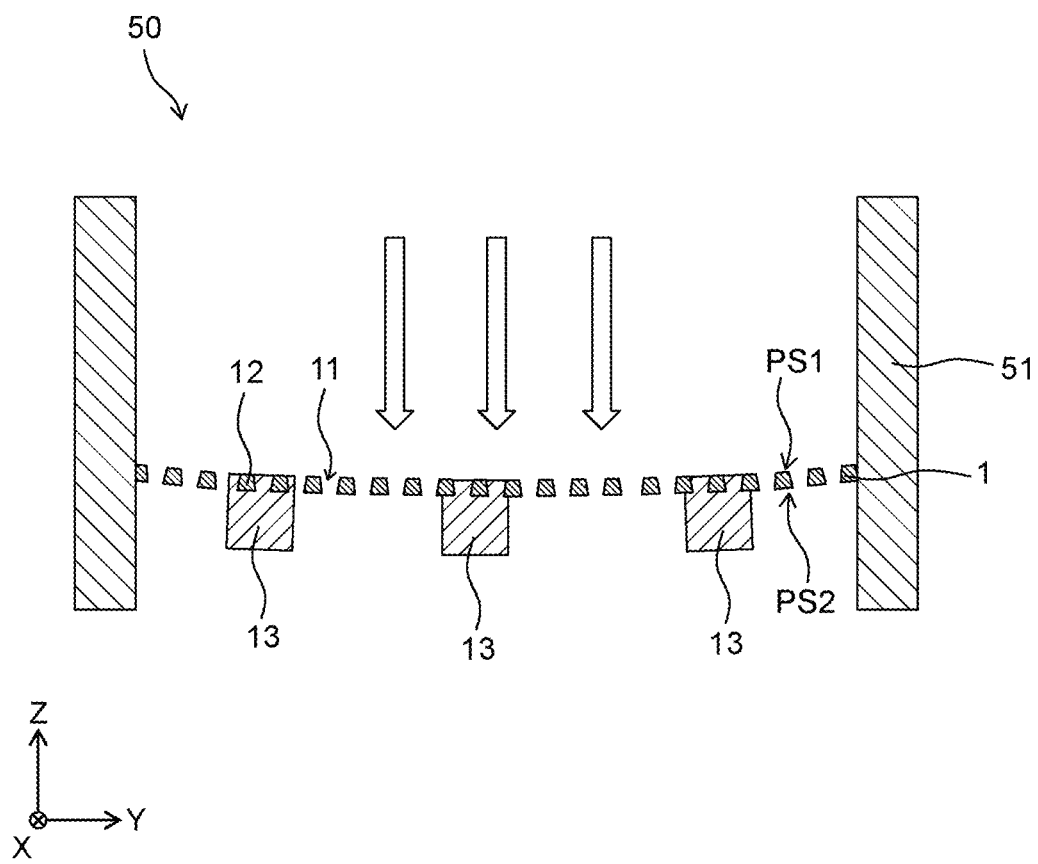
FIG. 9 is a schematic view illustrating an example of a filter device including the filter according to Embodiment 1 of the present invention.
Figure 10A:
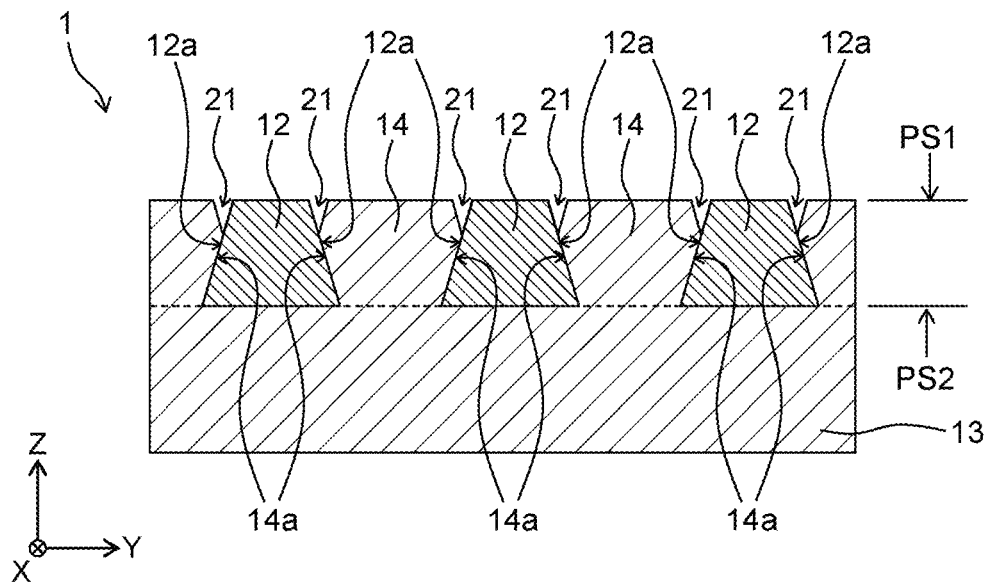
FIG. 10A is a schematic view illustrating an example of deformation of the filter according to Embodiment 1 of the present invention.
Figure 10B:
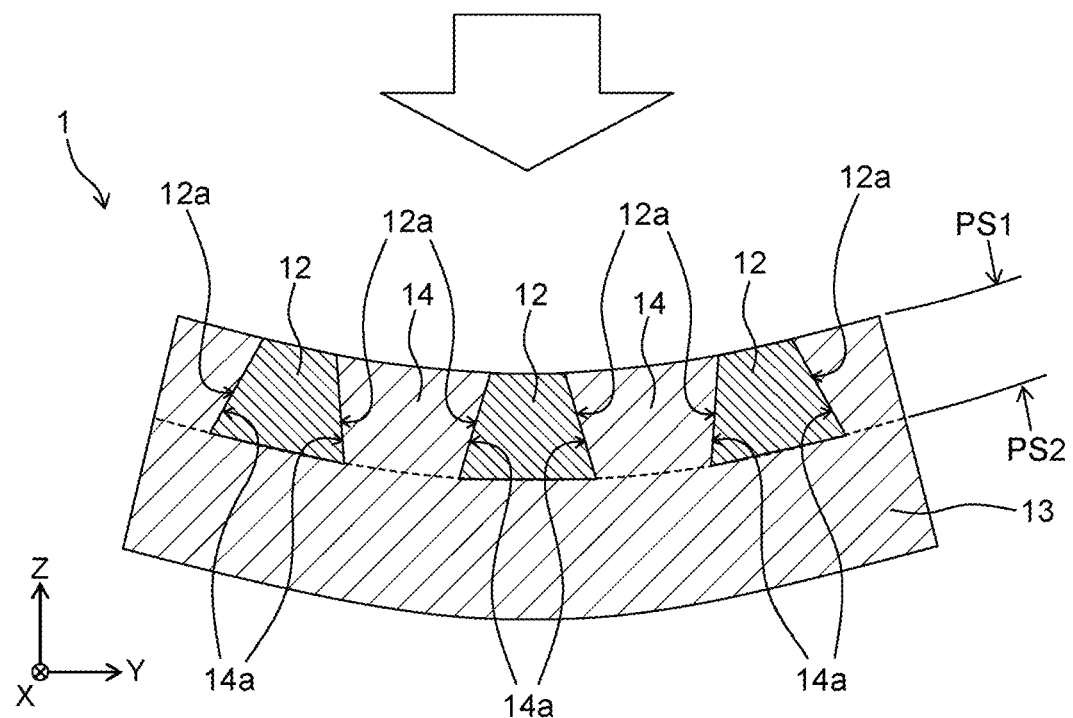
FIG. 10B is a schematic view illustrating an example of deformation of the filter according to Embodiment 1 of the present invention.

An example of the operation of the filter 1 will be described with reference to FIG. 9, FIG. 10A, and FIG. 10B. FIG. 9 is a schematic view illustrating an example of a filter device 50 including the filter 1 of Embodiment 1 according to the present invention. FIG. 10A and FIG. 10B are schematic views illustrating an example of deformation of the filter 1 of Embodiment 1 according to the present invention. Note that FIG. 9 illustrates the filter 1 after deformation. FIG. 10A illustrates an enlarged view of the filter 1 before deformation, and FIG. 10B illustrates an enlarged view of the filter 1 after deformation.

As illustrated in FIG. 9, the filter device 50 includes the filter 1 and a housing 51 that holds the filter 1. The filter 1 is mounted inside the housing 51. The housing 51 is formed in a cylindrical shape and sandwiches the frame portion 20 of the filter 1.

In the filter device 50, a liquid containing a filtration object flows inside the housing 51. As a result, the fluid containing the filtration object passes through the filter 1, whereby filtration is performed. At this time, force is applied to the filter 1 by the fluid in a direction in which the fluid flows, and the filter 1 is bent in a concave shape.

As illustrated in FIG. 10A, in the filter 1 before deformation, the clearance 21 is formed between the filter base portion 12 and the support portion 13. To be more specific, the clearance 21 is formed between the inner wall 12a of the filter base portion 12 and the outer wall 14a of the protruding portion 14.

As illustrated in FIG. 10B, when the filter 1 is bent and deformed, the filter 1 is deformed in the clearance 21. To be specific, when the filter 1 is bent in a direction from the first main surface PS1 toward the second main surface PS2, the filter 1 is deformed such that the filter base portion 12 is compressed by the protruding portion 14 of the support portion 13. At this time, when the clearance 21 is formed between the filter base portion 12 and the protruding portion 14, the filter 1 is deformed in the clearance 21, and the stress applied to the filter 1 can be relaxed. Thus, damage due to deformation of the filter 1 can be suppressed.

Figure 11:
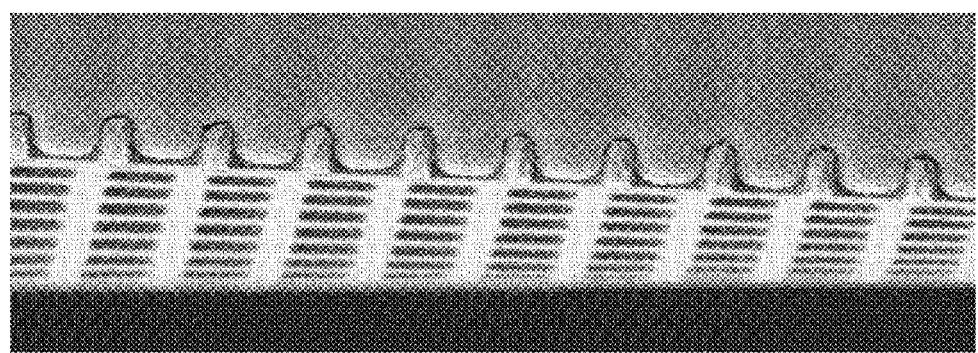
FIG. 11 is a photograph illustrating a cross section of the filter according to Embodiment 1 of the present invention.
Figure 12A:
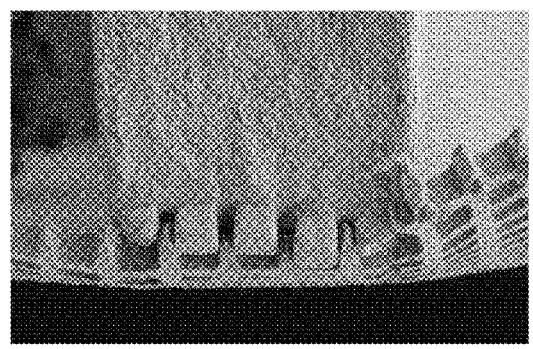
FIG. 12A is a photograph illustrating a cross section of the filter according to Embodiment 1 of the present invention.
Figure 12B:
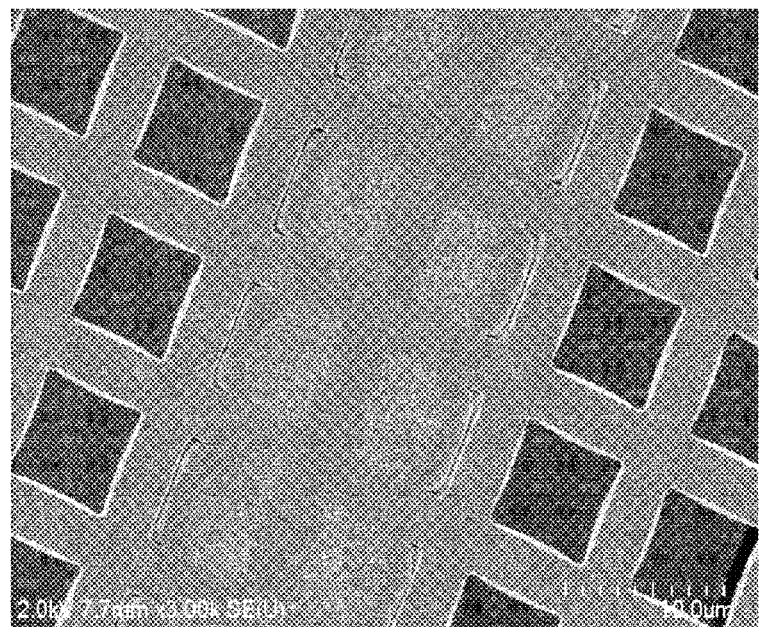
FIG. 12B is a photograph taken from the first main surface of the filter according to Embodiment 1 of the present invention.

FIG. 11 and FIG. 12A are photographs illustrating a cross section of the filter 1 of Embodiment 1 according to the present invention. FIG. 12B is a photograph of the filter 1 taken from the first main surface PS1 side of the filter 1 of Embodiment 1 according to the present invention. FIG. 11 and FIGS. 12A to 12B are photographs taken by an SEM (scanning electron microscope) SU-8040 manufactured by Hitachi High-Technologies Corporation. Note that the photograph was taken after the flat milling treatment. As illustrated in FIG. 11 and FIGS. 12A to 12B, it was observed that the protruding portion 14 of the support portion 13 was located in the through-hole 11, and the clearance 21 was formed between the filter base portion 12 and the protruding portion 14.

[Effects]

According to the filter 1 according to Embodiment 1, the following effects can be obtained.

The filter 1 includes the filter base portion 12 and the support portion 13. The filter base portion 12 has the first main surface PS1 and the second main surface PS1 on the side opposite to the first main surface PS2. In the filter base portion 12, the plurality of through-holes 11 that connects the first main surface PS1 and the second main surface PS2 is formed. The support portion 13 has the plurality of protruding portions 14 located in the plurality of through-holes 11, and is disposed on the second main surface PS2 of the filter base portion 12. The filter base portion 12 has the inner wall 12a extending from the second main surface PS2 toward the first main surface PS1 and defining the plurality of through-holes 11. The plurality of protruding portions 14 has the outer wall 14a in contact with the inner wall 12a of the filter base portion 12. In the plurality of through-holes 11 in which the plurality of protruding portions 14 are located, the first opening 11a on the first main surface PS1 side of the filter base portion 12 is larger than the second opening 11b on the second main surface PS2 side of the filter base portion 12. The clearance 21 is formed between the filter base portion 12 and the support portion 13.

With such a configuration, the strength of the filter 1 can be improved. For example, when an external force is applied to the filter 1, the filter 1 can be deformed into the clearance 21. Thus, the stress applied to the filter 1 can be relaxed, and the filter 1 can be prevented from being damaged.

The clearance 21 is formed between the inner wall 12a of the filter base portion 12 and the outer wall 14a of the plurality of protruding portions 14. With such a configuration, a space when the filter 1 is deformed in a direction in which the filter base portion 12 is compressed can be secured by the clearance 21. Thus, the stress applied to the filter 1 can be relaxed, and the filter 1 can be prevented from being damaged.

The clearance 21 is open to the first main surface PS1 side of the filter base portion 12. With such a configuration, when the filter 1 bends in a concave shape in a direction from the first main surface PS1 toward the second main surface PS2, it is easy to secure a space for deformation by the clearance 21. Therefore, the stress applied to the filter 1 can be relaxed, and the filter 1 can be further prevented from being damaged.

The inner wall 12a is formed by a flat surface extending obliquely from the second main surface PS2 toward the first main surface PS1 of the filter base portion 12. The outer wall 14a is formed by a flat surface extending obliquely from the second main surface PS2 toward the first main surface PS1 of the filter base portion 12. With such a configuration, the support portion 13 is easily held by the filter base portion 12, and the support portion 13 is less likely to be detached from the filter base portion 12.

Each of the plurality of protruding portions 14 has a protruding surface 14aa located on the first main surface PS1. When the filter base portion 12 is viewed from the first main surface PS1 side, the external dimension D1 of the protruding surface 14aa is equal to or more than 0.5 times and less than 1.0 times the dimension C1 of the first opening 11a. With such a configuration, the clearance 21 can be formed between the filter base portion 12 and the support portion 13. In addition, the clearance 21 can provide a space in which the filter 1 can be deformed when the filter 1 is deformed. Further, when the filter 1 is not deformed, the clearance 21 has such a size that the support portion 13 is not easily detached from the filter base portion 12.

The support portion 13 includes the plurality of first support members 13a extending in the first direction (X direction) and the plurality of second support members 13b extending in the second direction (Y direction) intersecting the first direction. With such a configuration, the strength of the filter 1 can be further improved.

The thermal expansion coefficient of the filter base portion 12 is substantially equal to the thermal expansion coefficient of the support portion 13. This configuration can prevent the filter 1 from being deformed and/or damaged due to temperature change.

The filter base portion 12 and the support portion 13 contain at least one of metal and metal oxide as a main component. With such a configuration, the strength of the filter 1 can be further improved.

Note that in Embodiment 1, an example in which the cross-sectional shape of the plurality of through-holes 11 when the filter 1 is cut in the Y direction is a trapezoidal shape has been described, but the present invention is not limited thereto. In other words, an example in which the cross-sectional shape of the filter base portion 12 is a trapezoidal shape (tapered shape) has been described, but the present invention is not limited thereto. In the through-hole 11, the first opening 11a on the first main surface PS1 side only needs to be larger than the second opening 11b on the second main surface PS2 side.

In Embodiment 1, an example in which the inner wall 12a of the filter base portion 12 is a flat surface has been described, but the present invention is not limited thereto. In addition, an example in which the outer wall 14a of the protruding portion 14 of the support portion 13 is a flat surface has been described, but the present invention is not limited thereto.

Figure 13A:
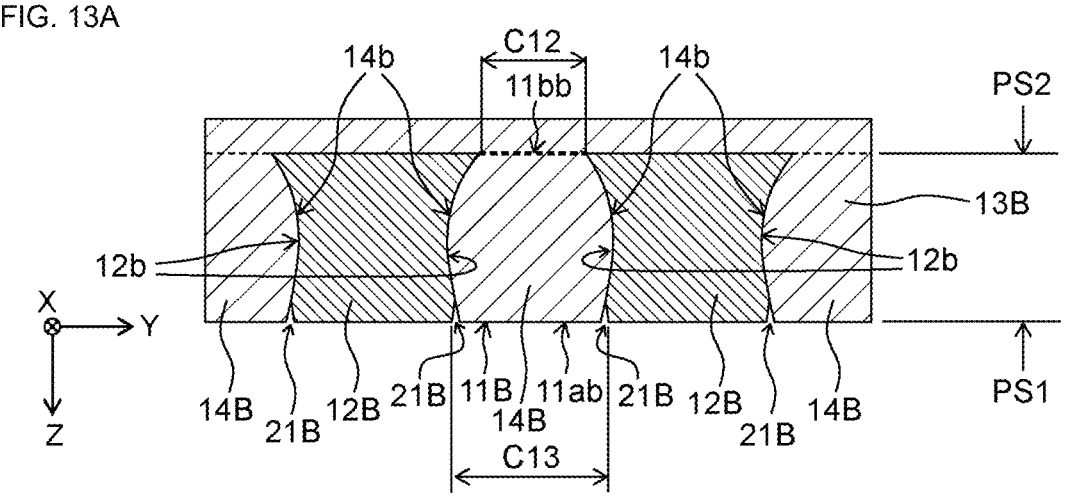
FIG. 13A is an enlarged cross-sectional view of a filter according to a modification of Embodiment 1 of the present invention.
Figure 13B:
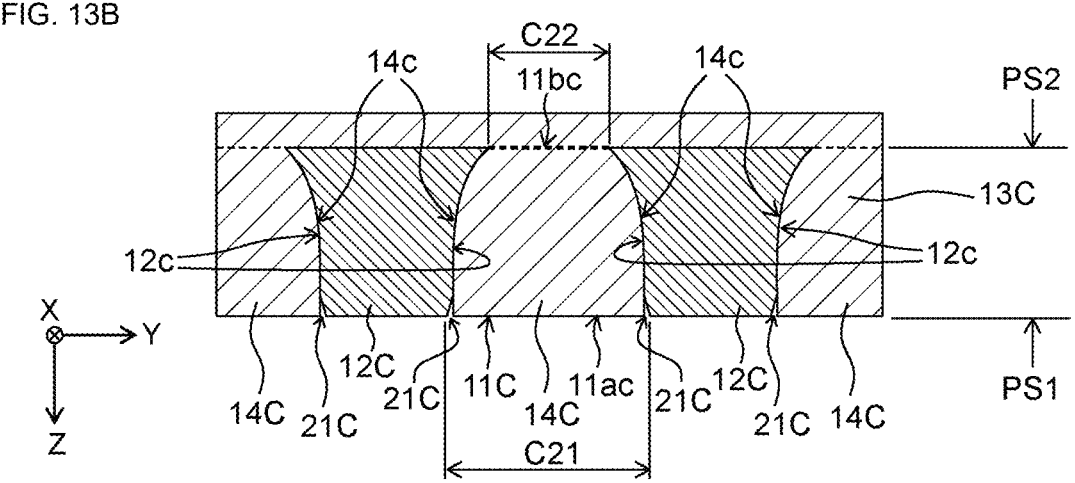
FIG. 13B is an enlarged cross-sectional view of a filter according to a modification of Embodiment 1 of the present invention.
Figure 13C:
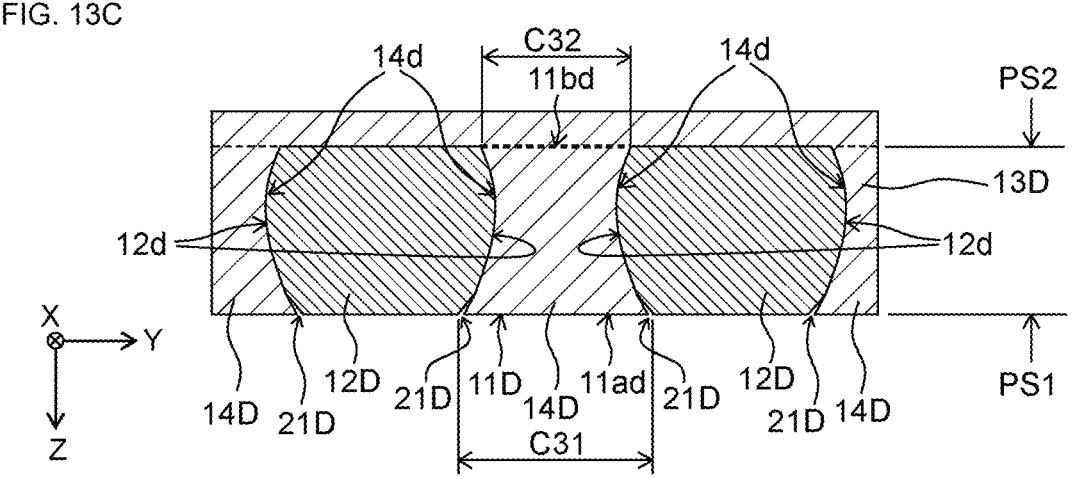
FIG. 13C is an enlarged cross-sectional view of a filter according to a modification of Embodiment 1 of the present invention.

FIGS. 13A to 13C are enlarged cross-sectional views of a filter of a modification of Embodiment 1 according to the present invention. As illustrated in FIG. 13A, an inner wall 12b of a filter base portion 12B may be formed to be curved. For example, the inner wall 12b may be curved in a U-shape. An outer wall 14b of a protruding portion 14B of a support portion 13B may be formed to be curved along the shape of the inner wall 12b. For example, the outer wall 14b may be curved in a gentle convex shape. In a through-hole 11B, a dimension C13 of a first opening 11ab on the first main surface PS1 side is larger than a dimension C12 of a second opening 11bb on the second main surface PS2 side. A clearance 21B is formed between the inner wall 12b of the filter base portion 12B and the protruding portion 14B.

As illustrated in FIG. 13B, an inner wall 12c of a filter base portion 12C may be formed to be curved. For example, the inner wall 12c may be formed such that the opening area of a through-hole 11C gradually increases from the second main surface PS2 toward the first main surface PS1. An outer wall 14c of a protruding portion 14C of a support portion 13C may be formed to be curved along the shape of the inner wall 12c. In the through-hole 11C, a dimension C21 of a first opening 11ac on the first main surface PS1 side is larger than a dimension C22 of a second opening 11bc on the second main surface PS2 side. A clearance 21C is formed between the inner wall 12c of the filter base portion 12C and the protruding portion 14C.

As illustrated in FIG. 13C, an inner wall 12d of a filter base portion 12D may be formed to be curved. For example, the inner wall 12d may be formed in a gentle convex shape. An outer wall 14d of a protruding portion 14D of a support portion 13D may be formed to be curved along the shape of the inner wall 12d. For example, the outer wall 14d may be curved in a U-shape. In a through-hole 11D, a dimension C31 of a first opening 11ad on the first main surface PS1 side is larger than a dimension C32 of a second opening 11bd on the second main surface PS2 side. A clearance 21D is formed between the inner wall 12d of the filter base portion 12D and the protruding portion 14D.

Also in the configurations illustrated in FIGS. 13A to 13C, the effect of improving the strength of the filter 1 is achieved, similar to Embodiment 1.

In Embodiment 1, an example in which the dimension C1 of the first opening 11a is larger than the dimension C2 of the second opening 11b in all the through-holes 11 has been described, but the present invention is not limited thereto. It is sufficient that the dimension C1 of the first opening 11a is larger than the dimension C2 of the second opening 11b in the portion where the support portion 13 is disposed in the filter base portion 12. In other words, in the plurality of through-holes 11 in which the plurality of protruding portions 14 are located, the first opening 11a on the first main surface PS1 side of the filter base portion 12 only needs to be larger than the second opening 11b on the second main surface PS2 side of the filter base portion 12. In the plurality of through-holes 11 in which the plurality of protruding portions 14 are not located, the first opening 11a and the second opening 11b may have the same size. For example, in the plurality of through-holes 11 in which the plurality of protruding portions 14 are not located, the through-holes 11 may be formed by the flat inner wall 12a extending to be orthogonal to the first main surface PS1 and the second main surface PS2.

In Embodiment 1, an example in which the support portion 13 is formed of a plate-shaped member has been described, but the present invention is not limited thereto. The support portion 13 only needs to have a shape capable of supporting the filter base portion 12 from the second main surface PS2 side.

Figure 14A:
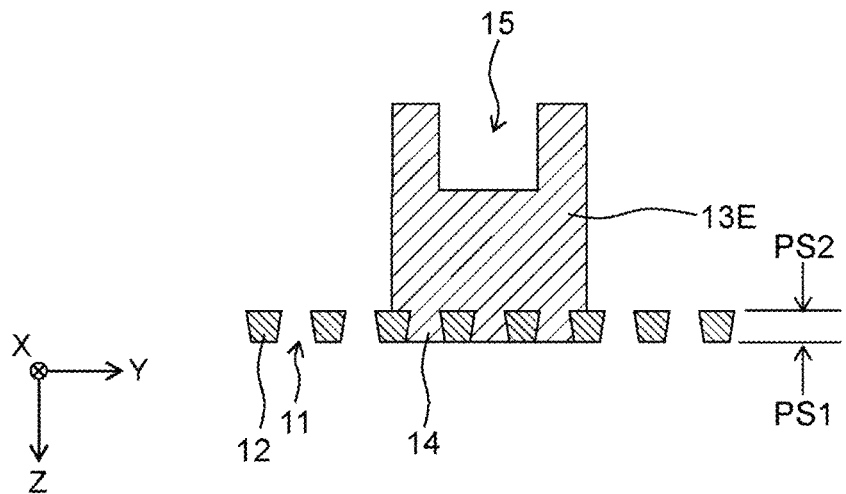
FIG. 14A is an enlarged cross-sectional view of a filter according to a modification of Embodiment 1 of the present invention.
Figure 14B:
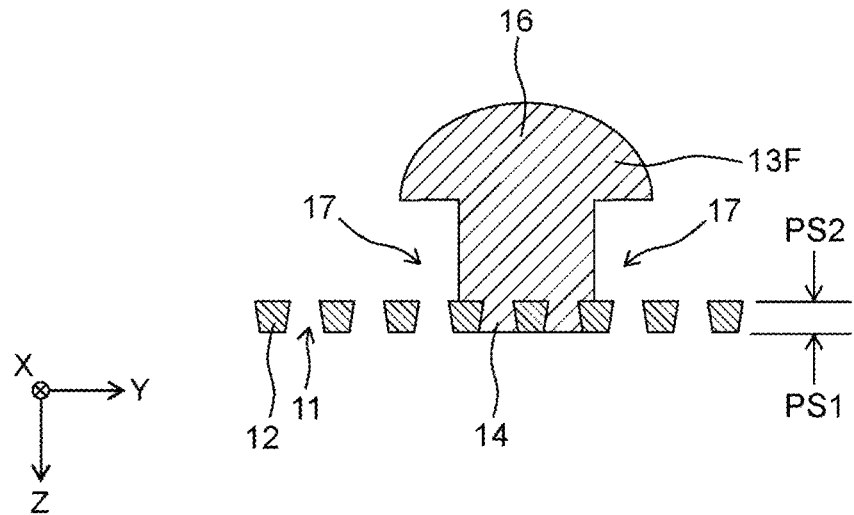
FIG. 14B is an enlarged cross-sectional view of a filter according to a modification of Embodiment 1 of the present invention.

FIG. 14A and FIG. 14B are enlarged cross-sectional views of a filter of a modification of Embodiment 1 according to the present invention. As illustrated in FIG. 14A, a support portion 13E may be provided with a concave portion 15 in the fourth main surface PS4. With such a configuration, it is possible to reduce a material forming the support portion 13E while reinforcing the filter base portion 12 by the support portion 13E. Therefore, the cost can be reduced as compared with the filter 1 of Embodiment 1.

As illustrated in FIG. 14B, a support portion 13F may be provided with a convex portion 16 on the fourth main surface PS4. The convex portion 16 has a shape protruding in a hemispherical shape. In addition, a notch 17 may be provided in the sidewall of the support portion 13F. With such a configuration, it is possible to reduce the number of through-holes 11 blocked by the protruding portion 14 while reinforcing the filter base portion 12 by the support portion 13F.

In Embodiment 1, an example in which the clearance 21 is formed between the inner wall 12a of the filter base portion 12 and the outer wall 14a of the protruding portion 14 has been described, but the present invention is not limited thereto. The clearance 21 only needs to be formed between the filter base portion 12 and the support portion 13. For example, the clearance may be formed between the second main surface PS2 of the filter base portion 12 and the third main surface PS3 of the support portion 13 (i.e., an outermost surface of the protruding portion).

Figure 15A:
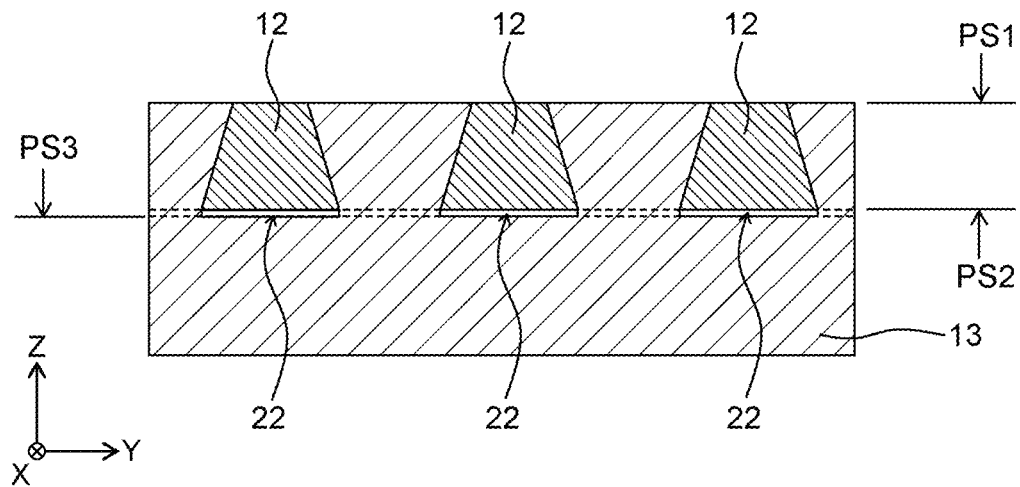
FIG. 15A is a schematic view illustrating an example of deformation of a filter according to a modification of Embodiment 1 of the present invention.
Figure 15B:
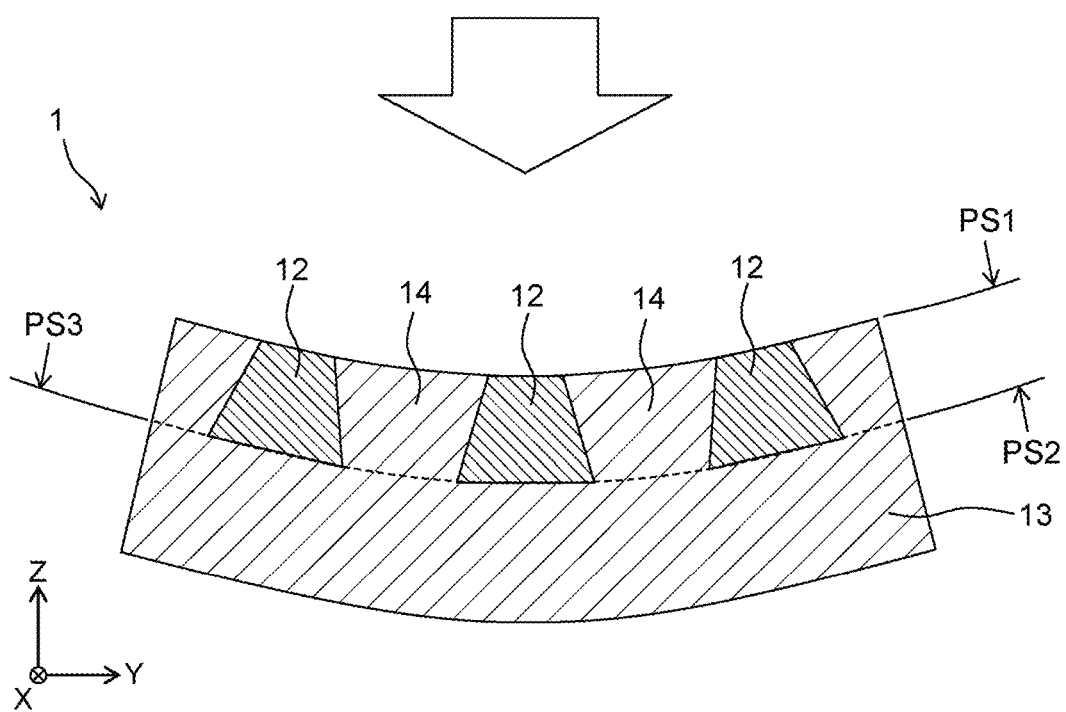
FIG. 15B is a schematic view illustrating an example of deformation of the filter according to the modification of Embodiment 1 of the present invention.

FIG. 15A and FIG. 15B are schematic views illustrating an example of deformation of a filter of a modification of Embodiment 1 according to the present invention. FIG. 15A illustrates an enlarged view of the filter before deformation, and FIG. 15B illustrates an enlarged view of the filter after deformation. As illustrated in FIG. 15A, before deformation, a clearance 22 is formed between the second main surface PS2 of the filter base portion 12 and the third main surface PS3 of the support portion 13. As illustrated in FIG. 15B, when the filter is bent and deformed, the filter is deformed in the clearance 22. To be specific, when the filter is bent in a direction from the first main surface PS1 toward the second main surface PS2, the filter 1 is deformed such that the filter base portion 12 is compressed by the protruding portion 14 of the support portion 13. At this time, the filter is deformed in the clearance 22, and the stress applied to the filter can be relaxed. As a result, damage due to deformation of the filter can be suppressed.

Although the present invention has been fully described in connection with the preferred embodiments with reference to the accompanying drawings, various changes and modifications will become apparent to those skilled in the art. Such changes and modifications are to be understood as included within the scope of the present invention as defined by the appended claims unless they depart therefrom.

Since the strength can be improved, the filter of the present invention is useful for filtration of a fluid containing a filtration object.

REFERENCE SIGNS LIST

1 FILTER
10 FILTER PORTION
11, 11B, 11C, 11D THROUGH-HOLE
11a, 11ab, 11ac, 11ad FIRST OPENING
11b, 11bb, 11bc, 11bd SECOND OPENING
12, 12B, 12C, 12D FILTER BASE PORTION
12a, 12b, 12c, 12d INNER WALL
12aa FIRST BASE MEMBER
12ba SECOND BASE MEMBER
13, 13B, 13C, 13D, 13E, 13F SUPPORT PORTION
13a FIRST SUPPORT MEMBER
13b SECOND SUPPORT MEMBER
14, 14B, 14C, 14D PROTRUDING PORTION
14a, 14b, 14c, 14d OUTER WALL
14aa PROTRUDING SURFACE
15 CONCAVE PORTION
16 CONVEX PORTION
17 NOTCH
20 FRAME PORTION
21, 21B, 21C, 21D, 22 CLEARANCE
30 SUBSTRATE
31 Cu FILM
32 RESIST FILM
33 PLATING FILM
34 RESIST FILM
35 PLATING FILM
50 FILTER DEVICE
51 HOUSING
PS1 FIRST MAIN SURFACE
PS2 SECOND MAIN SURFACE
PS3 THIRD MAIN SURFACE
PS4 FOURTH MAIN SURFACE

The invention claimed is:

1. A filter comprising:
a filter base portion having a first main surface and a second main surface opposite to the first main surface, the filter base portion defining a plurality of through-holes connecting the first main surface and the second main surface via an inner wall extending from the second main surface toward the first main surface; and
a support portion that has a plurality of protruding portions located in respective through-holes of the plurality of through-holes and disposed on the second main surface of the filter base portion, the plurality of protruding portions having an outer wall in contact with the inner wall of the filter base portion,
wherein, in the respective through-holes in which the plurality of protruding portions are located, a first opening on the first main surface side of the filter base portion is larger than a second opening on the second main surface side of the filter base portion, and there is a clearance between the filter base portion and the support portion.

2. The filter according to claim 1, wherein the clearance is located between the inner wall of the filter base portion and the outer wall of the plurality of protruding portions.

3. The filter according to claim 2, wherein the clearance is located at least on the first main surface of the filter base portion.

4. The filter according to claim 2,
wherein the inner wall is a flat surface extending obliquely from the second main surface toward the first main surface of the filter base portion, and
the outer wall is a flat surface extending obliquely from the second main surface toward the first main surface of the filter base portion.

5. The filter according to claim 1,
wherein each of the plurality of protruding portions has a protruding surface aligned with the first main surface, and
when the filter base portion is viewed from the first main surface, an external dimension of the protruding surface is 0.5 times to less than 1.0 times a dimension of the first opening.

6. A filter comprising:
a filter base portion having a first main surface and a second main surface opposite to the first main surface, the filter base portion defining a plurality of through-holes connecting the first main surface and the second main surface via an inner wall extending from the second main surface toward the first main surface; and
a support portion that has a plurality of protruding portions located in respective through-holes of the plurality of through-holes and disposed on the second main surface of the filter base portion, the plurality of protruding portions having an outer wall in contact with the inner wall of the filter base portion,
wherein, in the respective through-holes in which the plurality of protruding portions are located, a first opening on the first main surface side of the filter base portion is larger than a second opening on the second main surface side of the filter base portion, and there is a clearance between the filter base portion and the support portion, and
wherein the support portion includes a plurality of first support members extending in a first direction and a plurality of second support members extending in a second direction intersecting the first direction.

7. The filter according to claim 6, wherein the plurality of first support members and the plurality of second support members are arranged at equal intervals.

8. The filter according to claim 7, wherein the equal interval between the plurality of first support members and the plurality of second support members is 200 μm to 500 μm.

9. The filter according to claim 1, wherein a thermal expansion coefficient of the filter base portion and a thermal expansion coefficient of the support portion are substantially equal to each other.

10. The filter according to claim 1, wherein the filter base portion and the support portion contain at least one of a metal and a metal oxide as a main component thereof.

11. The filter according to claim 1, wherein a thickness T of the filter base portion is 0.5 μm to 20 μm.

12. The filter according to claim 1, wherein the inner wall of the filter base portion is curved.

13. The filter according to claim 12, wherein the outer wall of the protruding portion of the support portion is curved along the shape of the inner wall.

14. The filter according to claim 1, wherein the support portion includes a concave portion in a surface thereof opposite to the protruding portions.

15. The filter according to claim 1, wherein the support portion includes a convex portion in a surface thereof opposite to the protruding portions.

16. The filter according to claim 1, wherein a sidewall of the support portion includes a notch.

17. The filter according to claim 1, wherein the clearance is located between the second main surface of the filter base portion and an outermost surface of the protruding portion.

* * * * *